Oct. 18, 1927.
W. E. WARNER
1,645,675
BUNG FOR METAL RECEPTACLES
Filed March 13, 1926
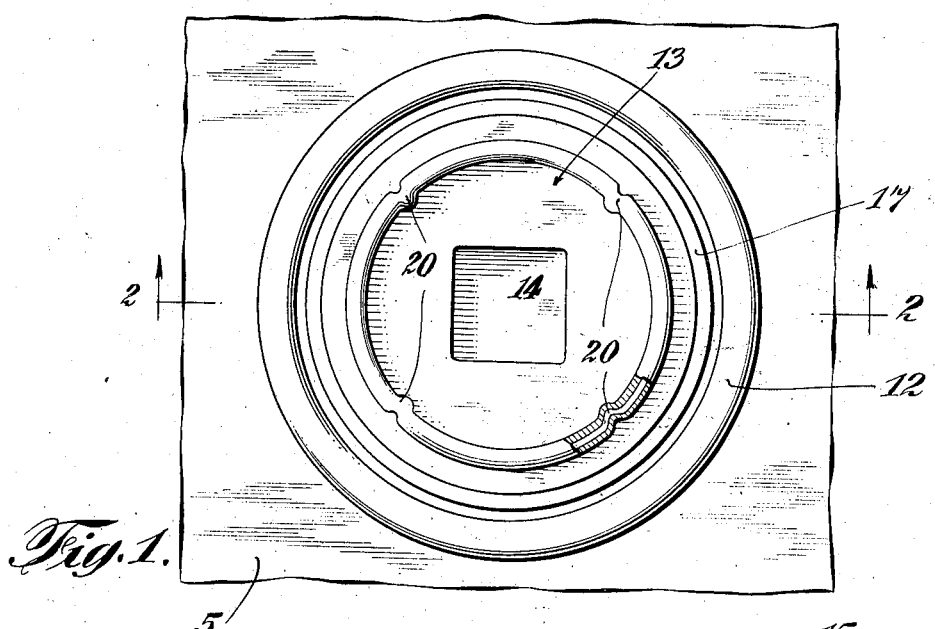
Fig. 1.
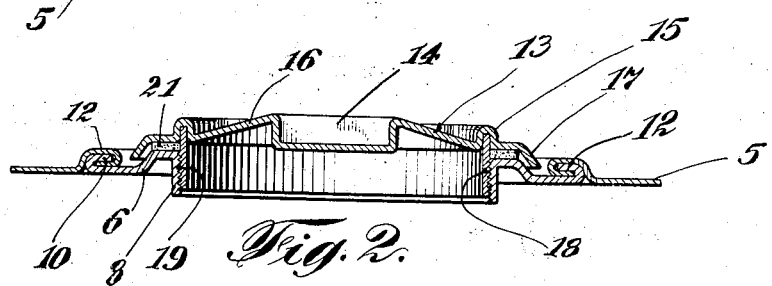
Fig. 2.
Fig. 3.
INVENTOR
William E. Warner
BY
his ATTORNEY Patented Oct. 18, 1927.

1,645,675

UNITED STATES PATENT OFFICE.

WILLIAM E. WARNER, OF LINDEN, NEW JERSEY, ASSIGNOR TO WARNER BROS. INC., OF NEWARK, NEW JERSEY, A CORPORATION OF NEW JERSEY.

BUNG FOR METAL RECEPTACLES.

Application filed March 13, 1926. Serial No. 94,387.

This invention relates to an improved bung for metal receptacles such as drums, casks, barrels, and the like, and has for its primary object to provide a bung construction wherein the several parts may be inexpensively produced from stamped or drawn sheet metal and which will provide a fluid tight seal or closure for the opening of the receptacle wall.

It is another and more particular object of my present improvements to provide a bung construction embodying a male member consisting of a head plate and an externally threaded sleeve with novel means for rigidly uniting the sleeve at one of its ends with said plate.

With the above and other objects in view. the construction consists in the improved bung construction for receptacles, and in the form, construction and relative arrangement of its several parts as will be hereinafter more fully described, illustrated in the accompanying drawings, and subsequently incorporated in the subjoined claims.

In the drawings, wherein I have disclosed one simple and practical embodiment of the invention and in which similar reference characters designate corresponding parts throughout the several views,—

Figure 1 is a top plan view partly in section showing one form of my present improvements;

Fig. 2 is a sectional view taken on the line 2—2 of Fig. 1, and

Fig. 3 is a similar sectional view of the female member and illustrating the manner of attaching or connecting the same to the wall of the receptacle.

Referring in detail to the drawings, the receptacle wall indicated at 5 is provided with a bung receiving opening of the proper diameter. The bung construction as herein shown includes a female member 6 which is stamped and drawn from a sheet metal plate of the proper gauge to provide an inner annular raised portion or bead 7 having a cylindrical flange 8 at the inner side thereof internally threaded as at 9. At its outer edge in spaced relation to the bead 7, the member 6 is formed with the annular flange 10 projecting in an opposite direction with respect to the internally threaded flange 8.

When the bung receiving opening is formed in the wall of the sheet metal receptacle, said wall at the edge of the opening is turned outwardly to provide the flange 11 thereon. In assembling the member 6, the flange 10 is engaged against the inner face of the flange 11 of the receptacle wall and the intermediate part of the member 6 between said flange and the bead 7 is positioned substantially in the plane of the receptacle wall. The edge of the flange 11 is then turned inwardly over the flange 10 as shown in Fig. 3 of the drawings, and the two flanges are then bent inwardly and downwardly together upon the member 6 as clearly seen in Fig. 2 of the drawings, to provide the interlocking connection 12 therebetween, said interlocking parts being placed under heavy pressure and securely clinched together. If desired in addition, these interlocked flanges 10 and 11 may be spot welded together at spaced points.

The other male member of the bung construction includes a head 13 consisting of a stamped and drawn sheet metal plate having a central rectangular depression 14 formed therein for the purpose of receiving a suitable wrench. In spaced relation to said depression or socket 14, the plate is provided with an annular rib or bead 15, said plate between the bead 15 and the socket 14 being obliquely inclined upwardly as at 16 and providing a rigid connecting wall between said socket and bead. In spaced relation to the bead 15, the outer edge of the head plate 13 is bent to provide an inwardly extending angular flange 17 thereon.

The male member also includes the sheet metal sleeve 18 which is externally threaded as at 19. One end of this sleeve, as shown in Fig. 2, is fitted into the open side of the bead 15 and the walls of said bead are then tightly clinched together on the end of the sleeve and at spaced points, said bead and the end of the sleeve wall are bent inwardly as shown at 20 to positively interlock the sleeve with said bead and prevent independent rotation of the sleeve and the head plate 13.

Within the flange 17 and surrounding the sleeve 18 a suitable packing gasket or ring 21 is placed. Thus, when the sleeve 18 is threaded into the flange 8 of the female member and the male member turned by applying a wrench in the socket 14, the packing gasket is thereby compressed to produce a fluid and air tight closure of the opening in the female member.

It will be evident from the above description that the several parts of my improved bung construction being produced from stamped and drawn sheet metal elements may be manufactured at very small cost. At the same time, it will be evident that the construction of these parts is such as to afford maximum strength which will be capable of resisting severe internal or external pressures thereon. I have shown a construction which will be highly satisfactory in practical use, and is of general application to metal receptacles employed for various different purposes. It will, however, be understood that in certain cases it may be found necessary to vary the detailed structural features of the several parts in certain particulars, and I therefore, reserve the privilege of resorting to all such legitimate changes in the form, construction and arrangement of these various detail features of the invention as may be fairly incorporated in the spirit and scope of the invention, as defined in the appended claims.

I claim:

1. A bung for receptacles consisting of a dawn sheet metal head plate having a central rectangular wrench receiving socket and an annular marginal flange angularly positioned relative to the plane of said head plate, and an externally threaded sleeve fixed at one of its ends to said head plate in inwardly spaced relation from said flange and in concentric relation therewith.

2. A receptacle bung consisting of a drawn sheet metal head plate having a central rectangular socket and a marginal annular flange angularly disposed with respect to the plane of said head plate and an intermediate obliquely inclined annular section between said socket and said flange, and an externally threaded sleeve fixed at one of its ends to the head plate at the outer edge of said intermediate annular section and in concentric relation with said flange.

3. A receptacle bung consisting of a drawn sheet metal head plate having a central rectangular wrench receiving socket and an annular marginal flange obliquely inclined outwardly from a relatively narrow annular section of said plate disposed substantially in the plane of the base wall of said socket, a relatively wide annular section of the plate obliquely inclined with respect to said plane and connecting said narrow annular section thereof with the side walls of said socket, and an externally threaded sleeve fixed to the head plate at the outer edge of said latter section thereof.

4. A receptacle bung consisting of a drawn sheet metal head plate having a central rectangular wrench receiving socket and an annular marginal flange obliquely inclined outwardly from a relatively narrow annular section of said plate disposed substantially in the plane of the base wall of said socket, a relatively wide annular section of the plate obliquely inclined with respect to said plane and connecting said narrow annular section thereof with the side walls of said socket, a bead formed in said plate at the juncture of said narrow and wide annular sections thereof, and a sleeve fixed at one of its ends in said bead and projecting from one side of the head plate for engagement in a bushing.

5. A receptacle bung consisting of a drawn sheet metal head plate having a central rectangular wrench receiving socket and an annular marginal flange obliquely inclined outwardly from a relatively narrow annular section of said plate disposed substantially in the plane of the base wall of said socket, a relatively wide annular section of the plate obliquely inclined with respect to said plane and connecting said narrow annular section thereof with the side walls of said socket, a bead formed in said plate at the juncture of said narrow and wide annular sections thereof, a sleeve fixed at one of its ends in said bead and projecting from one side of the head plate for engagement in a bushing, and said end of the sleeve and the walls of the bead at spaced points being angularly bent to thereby interlock the head plate and sleeve together against relative rotation.

In testimony that I claim the foregoing as my invention, I have signed my name hereto.

WILLIAM E. WARNER.